United States Patent [19]

Kaneko et al.

[11] 4,231,561
[45] Nov. 4, 1980

[54] AUTO DOCUMENT FEEDER FOR USE WITH DUPLEX COPYING MACHINE

[75] Inventors: Tamaki Kaneko, Fujisawa; Seiichi Miyakawa, Nagareyama; Toyokazu Satomi, Yokohama; Yutaka Koizumi, Kawasaki; Isao Nakamura, Tokyo; Yasuhiro Tabata, Kawasaki, all of Japan

[73] Assignee: Ricoh Company, Ltd., Japan

[21] Appl. No.: 875,537

[22] Filed: Feb. 6, 1978

[30] Foreign Application Priority Data

| Feb. 10, 1977 | [JP] | Japan | 52-13843 |
| Feb. 28, 1977 | [JP] | Japan | 52-21283 |
| Mar. 25, 1977 | [JP] | Japan | 52-33772 |

[51] Int. Cl.$^2$ .......................... B65H 1/06; B65H 5/02; B65H 29/00
[52] U.S. Cl. ........................................ 271/3.1; 271/4; 271/9; 271/186; 355/3 SH; 355/23
[58] Field of Search ........................ 271/3.1, 3, 4, 5, 6, 271/7, 65, 186, DIG. 9, 9; 355/23, 24, 3 SH, 3 R

[56] References Cited

U.S. PATENT DOCUMENTS

| Re. 27,976 | 4/1974 | Sahley | 271/4 X |
| 3,523,687 | 8/1970 | Petersen et al. | 271/186 |
| 3,552,739 | 1/1971 | Roberts et al. | 271/4 |
| 3,556,511 | 1/1971 | Howard et al. | 271/4 |
| 3,862,802 | 1/1975 | Till | 271/3 X |
| 4,078,789 | 3/1978 | Kittredge et al. | 271/65 |
| 4,080,060 | 3/1978 | Nothmann | 355/23 |
| 4,140,387 | 2/1979 | Gustafson | 355/23 X |

OTHER PUBLICATIONS

Rogers, J. C. et al. "Document Feed" *IBM Technical Disc. Bulletin*, vol. 14, No. 5, Oct. 1971, p. 1547.
Bullock, M. K. "Duplex Document Feeder" *IBM Technical Disc. Bulletin*, vol. 19, No. 12, May 1977, p. 4496.

*Primary Examiner*—Bruce H. Stoner, Jr.
*Attorney, Agent, or Firm*—McGlew and Tuttle

[57] ABSTRACT

The auto document feeder is for use with duplex copying machines, and is capable of inverting duplex sheet originals, having images on both surfaces, automatically and feeding the originals to an exposure station automatically. The feeder comprises trays for stacking a plurality of sheet originals to be copied, sheet feeding devices for feeding the sheet originals individually from the trays to the exposure station, a platen belt mounted on the exposure station and operable to transport a sheet original across the exposure station and to maintain each sheet original in close contact with the exposure station during exposure of the sheet original, from either side of the exposure station, sheet inverting devices for inverting sheet originals received from the exposure station, and a sheet transport device for transporting inverted sheet originals to the exposure station for completing the duplex copy. In one preferred embodiment, two substantially identical sheet original tables are disposed on opposite sides of the exposure station, and each original table has a sheet feeding device, a sheet inverting or reversing device, and the associated elements. In another embodiment, a single sheet original cassette is used as a tray and is combined with a single upright sheet inverting or reversing device, whereby sheet originals are automatically inverted and fed to the exposure station.

12 Claims, 15 Drawing Figures

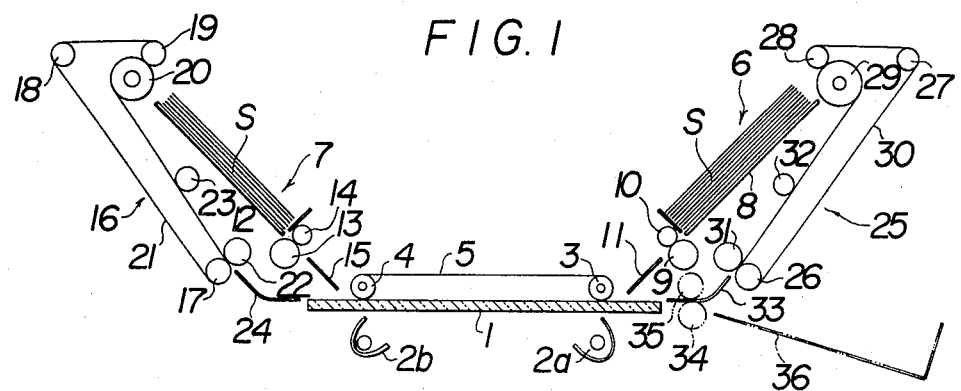
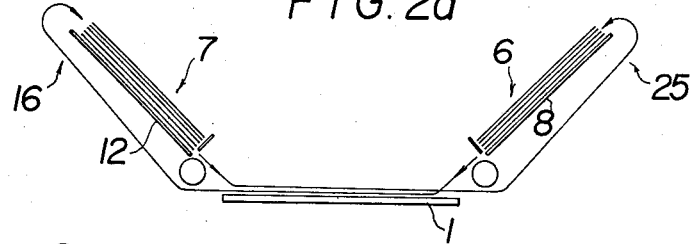
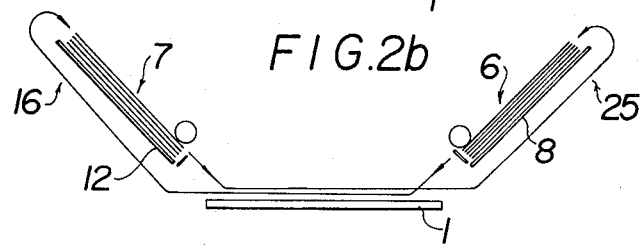
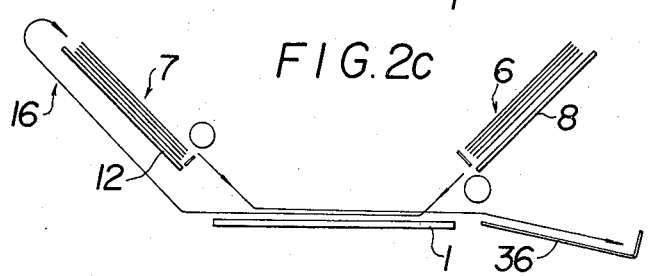
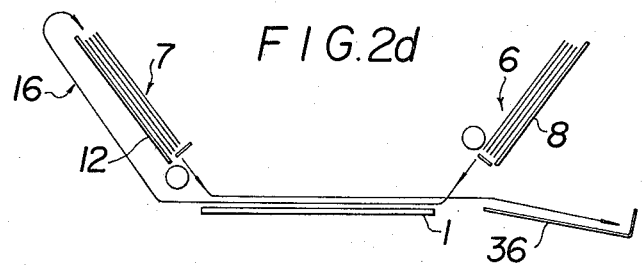

AUTO DOCUMENT FEEDER FOR USE WITH DUPLEX COPYING MACHINE

BACKGROUND OF THE INVENTION

The present invention relates to an auto document feeder for use with a duplex copying machine, and more particularly to an auto document feeder which permits automatic feeding of sheet originals having images on both sides to an exposure station of the duplex copying machine in the order of the pages.

Recently, duplex copying, namely the making of copies having images on both sides, has been studied by use of an electrophotographic copying apparatus.

In performing such duplex copying, particularly when duplex copies are made from sheet originals, in comparison with the conventional one-side copying, more care must be taken in setting such sheet originals in a duplex copying machine because, when setting duplex sheet originals in the copying machine, with respect to the order of pages, and inside and outside or top and bottom of each duplex sheet original, more mistakes are apt to occur.

Furthermore, as in the case of the conventional one-side copying, it is time-consuming to set such duplex sheet originals manually. Also, particularly in the case of printed sheet originals having images or letters on both sides, they must be reversed or inverted in order to make copies therefrom, so that the copying procedure becomes more complicated and accordingly mis-copying will occur more frequently.

Thus, for example, the following sheet-feeding devices have been developed. One device feeds sheet documents from a sheet original input tray to an exposure station and discharges the used sheet documents to a sheet original output tray and stacks them on the output tray. In such a sheet-feeding device, when all the sheet originals have been discharged to the output tray, they must be placed in the input tray again.

Another device comprises a sheet original input tray, and a sheet original output tray which can be used as another input tray as well. In this device, after sheet originals are fed from the input tray to the exposure station for exposure, they are discharged to the output tray and the discharged sheet originals are then fed from the output tray to the exposure station.

In the former device, it is troublesome to replace the used sheet originals from the output tray to the input tray. Furthermore, in both the former device and the latter device, the output tray has to be provided besides the input tray. Particularly, in the case of the latter device, sheet-feeding means, such as sheet-feeding rollers, have to be incorporated. Due to such requirement, the latter device is apt to become expensive and oversized.

SUMMARY OF THE INVENTION

It is therefore an object of the present invention to provide an auto document feeder capable of reversing or inverting duplex sheet originals automatically and feeding them to an exposure station of a copying machine automatically.

Another object of the present invention is to provide an auto document feeder having a single sheet original tray.

According to the present invention, one embodiment of the auto document feeder comprises a primary original sheet feeding apparatus, disposed on one side of an exposure station, capable of stacking sheet originals therein and feeding the sheet originals individually therefrom, a secondary original sheet feeding apparatus, disposed on the other side of the exposure station, capable of stacking sheet originals therein and feeding the sheet originals individually therefrom, and sheet reversing or inverting means which reverses or inverts sheet originals fed from the primary original sheet feeding apparatus to the exposure station and feeds the reversed or inverted sheet originals to the secondary original sheet feeding apparatus.

According to a more detailed feature of this embodiment, in addition to the above-mentioned sheet reversing or inverting means, another sheet reversing or inverting means can be provided, which reverses or inverts again sheet originals fed from the secondary original sheet feeding apparatus to the exposure station and feeds the sheet originals back to the primary original sheet feeding apparatus.

Another embodiment of the auto document feeder according to the present invention comprises a sheet original cassette for stacking sheet originals thereon, sheet-feeding means which feeds sheet originals individually from the sheet original cassette to one side of an exposure station of a copying machine, sheet original transfer means for transferring the sheet originals, which are fed to one side of the exposure station, to the other side of the exposure station, and sheet original reversing or inverting and accommodating means, disposed substantially upright or slantingly, having, at the lower portion thereof, an inlet portion for receiving sheet originals fed from the above-mentioned sheet original transfer means and a guide portion for guiding the sheet originals, which are discharged from the inlet portion, to one side of the exposure station.

In a further embodiment according to the present invention, sheet originals are individually fed from a tray holding a predetermined number of sheet originals to an exposure station of a copying machine. A dashboard is disposed so as to come selectively above the sheet originals held in the tray. The exposed sheet originals are stacked on the dashboard when they are returned to the tray. With a predetermined number of sheet originals, the dashboard is retracted from above the tray and the sheet originals are placed in the tray so that they are again fed from the tray.

BRIEF DESCRIPTION OF THE DRAWINGS

For a better understanding of the invention as well as other objects and further features thereof, reference is had to the following detailed description of the invention to be read in connection with the accompanying drawings, wherein:

FIG. 1 is a schematic sectional side elevation of and an embodiment of auto document feeder according to the present invention.

FIG. 2 (*a*) illustrates schematically a feeding path of sheet originals in the auto document feeder of FIG. 1.

FIG. 2 (*b*) illustrates schematically a feeding path of sheet originals in another auto document feeder according to the present invention.

FIG. 2 (*c*) illustrates schematically a feeding path of sheet originals in a further auto document feeder according to the present invention.

FIG. 2 (*d*) illustrates schematically a feeding path of sheet originals in a still further auto document feeder according to the present invention.

DETAILED DESCRIPTION OF THE PREFERRED EMBODIMENTS

Figure 3:
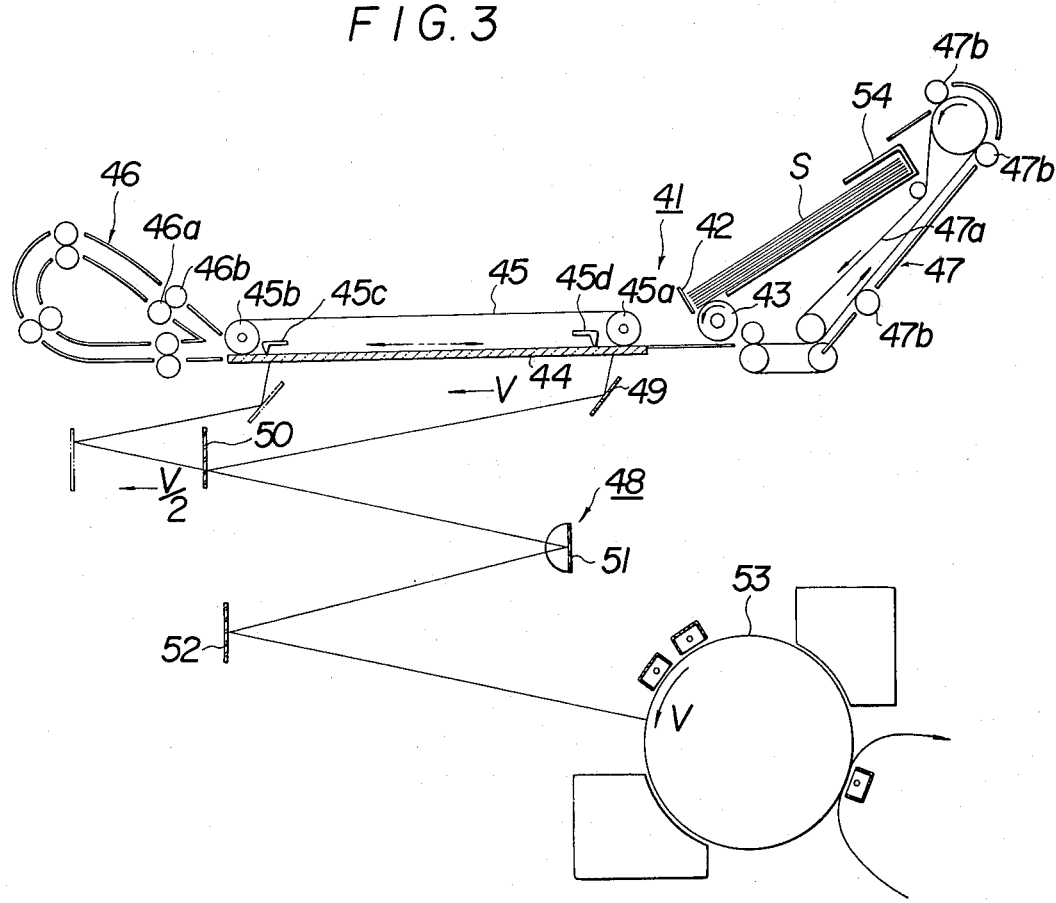
FIG. 3 is a schematic sectional side elevation of and a further embodiment of auto document feeder according to the present invention.

FIG. 1 is a schematic sectional side elevation of an embodiment of an auto document feeder according to the present invention, wherein reference numeral 1 represents a document platen made of, for example, a transparent glass. On opposite lower sides of the document platen 1 are disposed light sources 2a, 2b, and on the document platen 1 is mounted an endless platen belt 5 trained over or around a pair of rollers 3, 4. The endless platen belt 5 is to bring each sheet original into close contact with the document platen 1 and also to transport it along the document platen 1. More specifically, the endless platen belt 5 can be selectively moved in opposite directions by the rollers 3, 4 so that a sheet original, carried from a primary original document feeding apparatus 6 or from a secondary original document feeding apparatus 7 to the right end or to the left end of the document platen 1, can be transported to a predetermined position on the document platen 1 in contact with the document platen 1.

The primary original document feeding apparatus 6 is disposed on one side of the document platen 1, namely, on the right side of the document platen 1 in FIG. 1. In this embodiment, the primary original document feeding apparatus 6 is slantingly fixed to the right side of the document platen 1 and comprises a primary original table 8 capable of stacking a plurality of sheet originals S thereon, and a pair of sheet feeding rollers 9, 10 which draw the bottom sheet original out from the stack of sheet originals S. The primary original document feeding apparatus 6 is also provided with a guide plate 11 which is disposed between the sheet feeding rollers 9, 10 and the roller 3, in other words between the sheet feeding rollers 9, 10 and a sheet original input portion on the right side of the endless platen belt 5. The design of the guide plate 11 is such that sheet originals S drawn from the primary original table 8 by the sheet feeding rollers 9, 10 are individually guided into the sheet original input portion on the right side of the endless platen belt 5.

The secondary original document feeding apparatus 7 is disposed on the other side of the document platen 1, that is, on the left side of the document platen 1 in FIG. 1 and is constructed substantially in the same manner as the primary original document feeding apparatus 6. Namely, the secondary original document feeding apparatus 7 is slantingly fixed to the left side of the document platen 1 and comprises a secondary original table 12 capable of stacking a plurality of sheet originals S thereon, and a pair of sheet feeding rollers 13, 14 which draw the bottom sheet original from the stack of sheet originals S individually. The secondary original document feeding apparatus 7 is also provided with a guide plate 15 between the sheet feeding rollers 13, 14 and the roller 4, namely between the sheet feeding rollers 13, 14 and a sheet original input portion on the left side of the endless platen belt 5. The design of the guide plate 15 is such that sheet originals S drawn from the secondary original table 12 are individually guided into the above-mentioned sheet original input portion on the left side of the endless platen belt 5.

Moreover, on the left side of the document platen 1 is disposed a primary sheet reversing or inverting apparatus 16 which reverses or inverts each sheet original fed from the primary original document feeding apparatus 6 to the document platen 1 and feeds it to the secondary original table 12.

The primary sheet reversing or inverting apparatus 16 comprises a transfer belt 21 trained over rollers 17, 18, 19 with a sheet reversing or inverting roller 20 located near the upper end of the secondary original table 12, guide rollers 22, 23, and a guide plate 24 and is constructed so as to transport each sheet original, which is held between the roller 17 and the guide roller 21 which faces the roller 17 and is carried from the document platen 1 and guided by the guide plate 24, to the sheet reversing or inverting roller 20 by the transfer belt 21. Thus, the transporting direction of the sheet original is changed by substantially 180° by the sheet reversing or inverting roller 20 and the sheet original is then guided to the secondary original table 12.

Furthermore, in the case of this embodiment, on the right side of the document platen 1 is disposed a secondary sheet reversing or inverting apparatus 25 which is constructed substantially in the same manner as the above-mentioned primary sheet reversing or inverting apparatus 16. More specifically, the secondary sheet reversing or inverting apparatus 25 comprises a transfer belt 30 trained over or around rollers 26, 27, 28 with a sheet reversing or inverting roller 29 located near the upper end of the primary original table 8, guide rollers 31, 32 and a guide plate 33, and is constructed so as to transport each sheet original held between the roller 26 and the guide roller 31 from the document platen 1 to the sheet reversing or inverting roller 29 by the transfer belt 30 guided by the guide plate 33. Thus, the transporting direction of the sheet original is changed by 180° by substantially the sheet reversing or inverting roller 29, and the sheet original is then fed onto the primary original table 8.

A procedure of making duplex copies by use of the thus constructed auto document feeder is as follows. First, a plurality of duplex originals S to be copied, i.e., originals having images on both sides, are stacked on the primary original table 8 of the primary original document feeding apparatus 6 in order of pages in such a manner that the first page of the first original faces down. After the duplex originals S are stacked on the primary original table 8, the auto document feeder is started. At the command of starting duplex copying, the sheet feeding rollers 9, 10 of the primary original document feeding apparatus 6 are actuated, whereby the lowermost sheet original is drawn from the stack of sheet originals placed on the primary original table 8. The thus drawn first sheet original is transported along the guide plate 11 and fed between the document platen 1 and the endless platen belt 5 which is rotated clockwise between the rollers 3, 4. The sheet original is then transferred to the left in FIG. 1, in close contact with the document platen 1. During this process, the sheet original is illuminated by the light source 2a so that exposure of the sheet original is carried out. When the exposure has been completed, the sheet original is carried along the guide plate 24 and transported to the sheet reversing roller 20 by the transport belt 21, where its advancing direction is changed by substantially 180°. The sheet original is then stacked on the secondary original table 12 of the secondary original document feed apparatus 7. Since the advancing direction of the sheet original S is changed by substantially 180° by the abovementioned sheet reversing roller 20, the first page of the sheet original S is up and the second page thereof down when it is stacked on the secondary original table 12.

Therefore in contrast with the case where the sheet original S is stacked on the primary original table 8 of the primary original document feeding apparatus 6, the sheet original S is stacked in the opposite order of pages on the secondary original table 12.

At the stage where the first sheet original can be transported to the secondary original document feeding apparatus 7 by the transport belt 21, a second sheet original which is stacked on the primary original table 8 is transported to the document platen 1 and is subjected to the same exposure process as in the case of the first sheet original, and after being reversed or inverted, it is placed on the first sheet original stacked on the secondary original table 12. Hereafter, all the sheet originals stacked on the document original table 8 are transported to the secondary original table 12 in the same manner as mentioned above. Thus, all the sheet originals are stacked exposed side up on the secondary original table 12.

When it is detected that all the sheet originals have been stacked on the secondary original table 12, the sheet feeding rollers 13, 14 are actuated and the lowermost sheet original, namely the first sheet original, is drawn from the stack of sheet originals on the secondary original table 12.

The sheet original is then transported along the guide plate 15 and is fed into the nip formed by the document platen 1 and the endless platen belt 5 which is rotated counterclockwise between the rollers 3, 4. Thus, the first sheet original is transported in close contact with the document platen 1 to the right in FIG. 1. During the transportation of the sheet original, the back side, i.e., the second page of the sheet original is illuminated by the light source 2b for exposure. When the exposure has been finished, the first sheet original is transported along the guide plate 33 in the direction of the sheet reversing roller 29 by the transport belt 30. After the advancing direction of the sheet original is changed by substantially 180° through the sheet reversing or inverting roller 29, the sheet original is again stacked on the primary original table 8. Since the sheet original is reversed by substantially 180° through the sheet reversing roller 29 at this time, the sheet original is again placed with its first page down on the primary original table 8 in the exactly same manner as when it was placed on the primary original table 8. Hereafter, sheet originals are individually fed from the stack of sheet originals on the secondary original table 12, with the respective back sides down, to the document platen 1, where the sheet originals are exposed.

After passing through the sheet reversing or inverting roller 29, the sheet originals are individually transported to and stacked on the primary original table 8.

Duplex exposure (i.e., exposure of both sides) of one set of duplex sheet originals is completed when all the sheet originals stacked on the secondary original table 12 have been returned to the primary original table 8. At this time, the duplex sheet originals are stacked on the primary original table 8 in the same manner as when they were placed on the primary original table 8.

The order of pages of the sheet originals before copying thereof is the same as that after copying thereof.

Referring to FIG. 2 (*a*), there is schematically shown a feeding path of a sheet original in the above-mentioned auto document feeder.

In the above-mentioned embodiment, transfer sheets are also transported in the copying station in the same manner as the sheet originals are transported in the exposure station.

Furthermore, in the above-mentioned embodiment, the design of the primary original table 8 and the secondary original table 12 is such that the respective lowermost sheet originals are drawn therefrom one by one. However, the present invention is not confined to the details set forth, but an original table capable of taking out the respective top sheets from the original tables can be designed.

In this case, however, it is necessary that the sheet feeding roller of the secondary original table be retracted upwards from the secondary original table when the sheet feeding roller of the primary original table is actuated, namely when sheet originals are transported from the primary original table to the secondary original table, so that the sheet feeding roller of the secondary original table may not hinder the secondary original table from receiving sheet originals.

Also, when sheet originals are transported from the secondary original table to the primary original table, it is necessary that the sheet feeding roller of the primary original table also be retracted. FIG. 2 (*b*) shows the sheet feeding path of a sheet original in the above mentioned case.

Moreover, the auto document feeder can be constructed in such a manner that instead of the secondary sheet reversing or inverting apparatus 25, a pair of upper and lower sheet discharge rollers 34, 35 are mounted together with a sheet original output tray 36 on the side of the primary original document feed apparatus 6, namely on the right side in FIG. 1 as shown by long and two short dash lines so that sheet originals transported from the secondary original table 12 to the document platen 1 are directly discharged to the sheet original output tray 36. In this case, in order to stack used sheet originals in order of pages on the sheet original output tray 36, the manner of sheet feeding from the primary original table 8 and that from the secondary original table 12 have to be opposite. More specifically, referring to FIG. 2 (*c*), when sheet originals are fed from the primary original table 8, if the sheet feed is started with the bottom sheet, the sheet feeding from the secondary original table 12 has to be started with the top sheet. On the other hand as shown in FIG. 2 (d), in the case where the sheet feeding from the primary original table 8 is started with the top sheet, the sheet feeding from the secondary original table 12 has to be started with the bottom sheet.

FIG. 3 shows a further embodiment of auto document feeder according to the present invention, wherein reference numeral 41 represents an auto document feeder. The auto document feeder 41 comprises a sheet original feeding cassette 42, a sheet feed roller 43 which draws sheet originals individually from the sheet original cassette 42, an endless belt 45 which is rotatably mounted on a document platen 44 made of a transparent glass plate, a primary sheet transport apparatus 46, which is disposed on the left side of the endless belt 45, and reverses or inverts each sheet original and transports it again in the direction of the document platen 44, and a secondary sheet transport apparatus 47 which is disposed on the right side of the endless belt 45, and transports each sheet original fed from the endless belt 45 to the sheet original cassette 42.

Duplex sheet originals S, i.e., originals having images on both sides, are stacked in order of pages with the first page up in the sheet original cassette 42.

At the front portion of the bottom of the sheet original cassette 42 there is formed an opening. The sheet feeding roller 43 is disposed so as to face the opening, through which originals S are individually drawn, from the bottom sheet on in order. The thus drawn sheet originals S are individually fed into the nip formed by the endless belt 45 and the document platen 44. The endless belt 45 is adjusted so as to start its rotation with the start of rotation of the sheet feed roller 43 or in accordance with the detection that a sheet original has begun to be fed from the sheet original cassette 42. Initially, the endless belt 45 is rotated at a predetermined speed in the direction of an arrow indicated by solid line. The endless belt 45 consists of a plurality of band belts which are trained over or around a pair of roller 45a, 45b. Between the band belts are disposed stoppers 45c, 45d. Since the stopper 45c is in contact with the document platen 44, the leading edge of the sheet original S is stopped by engagement with the stopper 45c. Meanwhile, the stopper 45d is raised so as not to hinder the movement of the sheet original S. When the sheet original S engages the stopper 45c, the rotation of the endless belt 45 is stopped and exposure of the sheet original S is then started.

An exposure apparatus 48 comprises a first reflector 49, a second reflector 50, an in-mirror lens 51, and a third reflector 52. The first reflector 49 and the second reflector 50 are moved parallel with the document platen 44, at a speed ratio of 1:½, respectively. The first and second reflectors 49, 50 are moved in the direction of the arrow indicated by a solid line so that the sheet original S placed on the document platen 44 is exposed. When the reflectors 49, 50 have reached their respective positions indicated by long and two short dash lines, they are returned to their respective initial positions. A photoconductive member 53 is rotated in the direction of the arrow shown in FIG. 3 at a speed V. On the surface of the photoconductive member 53, there is formed a latent electrostatic image corresponding to an image of the sheet original S. The latent electrostatic image is developed and the developed image is transferred to the first page of a transfer sheet.

The exposed sheet original S is transported to a first sheet transport apparatus 46 by the endless belt 45 which has been rotated again. The sheet transport apparatus 46 is constructed so as to reverse or invert and transport the sheet original in the direction of the document platen 44 again. The apparatus 46 also has a pair of sheet feeding rollers 46a, 46b. When the sheet original S has reached the sheet feeding rollers 46a, 46b, the transfer of the sheet original S is temporarily stopped so as to wait for the next exposure, and when the reverse rotation of the endless belt 45 has been started in the direction of an arrow indicated by a dash line, the transfer of the sheet original S is resumed. At this moment, the stopper 45c is retracted in an inoperative position, but the stopper 45d is in an operative position. Thus the movement of the sheet original S is stopped by the stopper 45d. The sheet original S is placed on the document platen 44 with its second page down and is also scanned by the exposure apparatus 48.

An image formed on the photoconductive member 53 corresponding to an image of the second page of the sheet original S is transferred to the back side of the above-mentioned transfer sheet having had the image corresponding to that of the first page of the sheet original S. Thus, the making of a duplex copy from a duplex original is completed.

When exposure of both sides of the sheet original S has been finished, the sheet original is transported to a second sheet transport apparatus 47 by the endless belt 45 whose rotation has been started. The second sheet transport apparatus 47 consists of a transfer belt 47a which carries the sheet original S upwards, and a plurality of rollers 47b. The sheet original S is reversed or inverted one time by the second sheet transport apparatus 47 and is returned to the sheet original cassette 42.

The sheet original cassette 42 is provided with a dashboard 54 at the rear end thereof. The dashboard 54 is located above a stack of sheet originals S held in the sheet original cassette 42 and serves to prevent the sheet original S fed from the second sheet transport apparatus 47 from being mixed with unexposed sheet originals.

Thus, the remaining sheet original S are likwise stacked with the respective first pages up in order of pages on the dashboard 54 through the above-mentioned procedure. When a final sheet original S is taken out from the sheet original cassette 42 and the absence of a sheet original S under the dashboard 54 is detected, a predetermined copy cycle is completed.

A procedure of making a plurality of duplex copies from each duplex sheet original will now be explained. In the case where a duplex copying machine is not provided with a sorter, the above-mentioned copy cycle is repeated a required number of times, whereby the same number of sets of duplex copies as the repeated number of copy cycles can be obtained, stacked in order of pages. Namely, when the absence of sheet original S under the dashboard 54 is detected, a signal commanding the repetition of copying is produced by a preset counter (not shown), whereby the dashboard 54 is retracted from above the sheet original cassette 42, and a stack of sheet originals S which is partly placed on the dashboard 54 is completely placed in the sheet original cassette 42 for the next sheet feed. Hereafter, the same procedure is repeated.

On the other hand, in the case where a sorter is attached to the duplex copying machine or when a plurality of duplex copies are to be made without repeated feeding of the sheet originals S, exposure of each sheet original S is repeated a required number of times by the exposure apparatus 48 when each sheet original is placed on the document platen 44 so that exposure of each sheet original S is done at one time. This procedure reduces the number of opportunities of the sheet original S being scratched or damaged since the sheet originals S are not fed repeatedly. However, in the case where a sorter is not provided, the sorting of each set of duplex copies has to be made to bind each set when duplex copying has been completed.

In the case where duplex copies or one-side copies are made from a bound material, such as a book, the endless belt 45 of the auto document feeder 41 is mounted in such a manner that it can be retracted from the document platen 44 by swinging the endless belt 45 about an appropriate portion of the auto document feeder 41.

Figure 4:
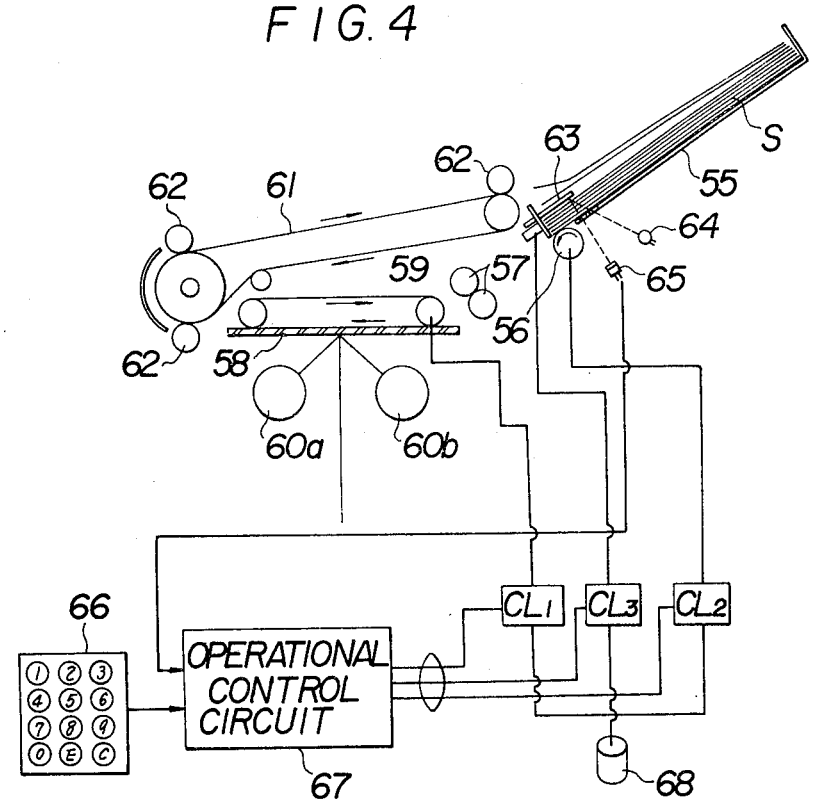
FIG. 4 shows a duplex copying machine including a further embodiment of an auto document feeder according to the present invention and a control circuit therefor in block diagram form.

FIG. 4 shows a further embodiment of auto document feeder according to the present invention. More specifically, FIG. 4 is a partial block diagram of a duplex copying machine having an exposure apparatus for exclusive use with sheet originals and particularly capable of making duplex copies from one-side sheet originals.

Referring now to FIG. 4, sheet originals S are placed in order of page with the first pages up in a sheet original feeding cassette 55. The sheet originals S are individually fed, starting with the bottom sheet original, by a sheet-feeding roller 56. The thus fed sheet original S is caused to pass through a slit exposure station 58 after passing through sheet transfer rollers 57, 57. On the slit exposure station 58, there is rotated an endless belt 59 which serves to transport sheet originals S and to bring each sheet original S into close contact with the slit exposure station 58.

Each sheet original S is exposed by exposure lamps 60a, 60b and a light image of the sheet original S is projected on a photoconductive member by an exposure system (not shown). The thus exposed sheet original S is stacked in the sheet original cassette 55 with the exposed side up after it is reversed or inverted one time by a sheet transport belt 61 and a plurality of transfer rollers 62.

A dashboard 63 is attached to the forward end portion of the sheet original cassette 55 and serves to separate the exposed sheet originals from unexposed sheet sheet originals S.

When exposure of all the sheet originals S in the sheet original cassette 55 has been completed, the absence of the sheet originals S is detected by a document detecting apparatus composed of a lamp 64 and a light receiving element 65, which is capable of detecting whether sheet originals are present or not under the dashboard 63. The presence or absence of sheet originals S is detected by putting a different color from that of sheet originals S on the back side of the dashboard 63 or by making the back side of the dashboard 63 a reflector so that the difference between the light quanitity from the sheet originals S and that from the back side of the dashboard 63 can be detected.

In the case of one-side sheet originals (i.e., originals having images on one side only), duplex copying is completed by a single process of feeding such sheet originals from the sheet original cassette 55. On the other hand, when duplex copies are made from duplex sheet originals (i.e., originals having images on both sides), the sheet originals partly placed on the dashboard 63 are again completely placed in the sheet original cassette 55 by retracting the dashboard 63 from above the sheet original cassette 55 in order to expose the respective back sides of the sheet originals S. Thus, duplex copying from duplex sheet originals is completed. When duplex copying is finished, the used duplex sheet originals are stacked on the sheet original cassette 55 with the first page up in order of pages.

By repeating the above-mentioned duplex copying procedure, a plurality of the same duplex copy sets can be obtained.

A control of each apparatus included in the above-mentioned duplex copying machine is as follows. First, an input indicating a desired number of copies to be made from each sheet original is applied to a preset counter 66. The preset counter 66 and the light receiving element 65 are connected with an operational control circuit 67. Operation signals are forwarded from the operational control circuit 67 to three clutches $CL_1$, $CL_2$ and $CL_3$, respectively. The endless transfer belt 59, sheet-feeding roller 56 and the dashboard 63 are connected with a driving apparatus 68 through the clutch $CL_1$, the clutch $CL_2$ and the clutch $CL_3$, respectively. The clutches $CL_1$ and $CL_2$ are actuated the same number of times as the number of sheet originals S held in the sheet original cassette 55 and, at the same time, the absence of the sheet originals S under the dashboard 63 is detected by the light receiving element 65 and the clutch $CL_3$ is actuated by the operational control circuit 67, whereby the dashboard 63 is retracted from above the sheet original cassette 55. Then the number indicated by the signal from the light receiving element 65 is compared with the copy number set in the preset counter 66 and, when a desired number of copies are obtained, the copying process is automatically stopped. As a matter of course, when "n" duplex copies are made from "n" duplex originals, the copying process is stopped when the number indicated by the signal forwarded from the light receiving element 65 to the operational control circuit 67 is 2n.

Figure 5:
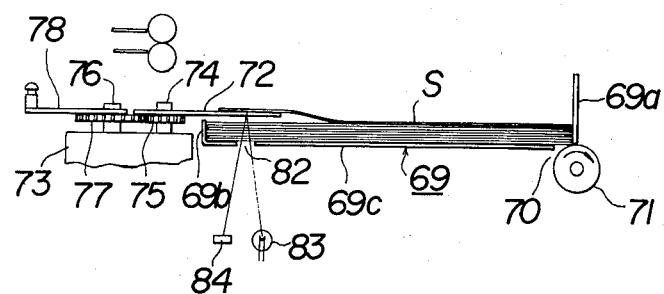
FIG. 5 is a schematic sectional side elevation of a sheet-feeding tray according to the present invention.
Figure 6:
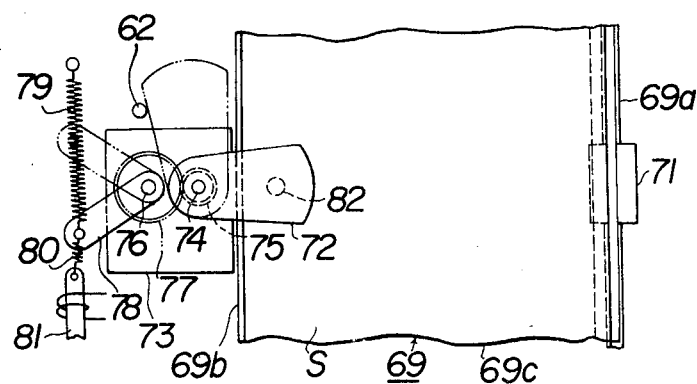
FIG. 6 is a schematic partial plan view of the sheet-feeding tray of FIG. 5.

FIG. 5 and FIG. 6 show a sheet-feeding apparatus according to the present invention. Referring to these figures, a sheet-feeding tray having a dashboard will now be particularly described. A sheet-feeding tray 69 comprises a front wall 69a, a back wall 69b, a bottom plate 69c and side plates (not shown). At the front portion of the bottom plate 69c, there is formed a sheet-feeding opening 70, through which sheets S are individually fed from a stack of sheets in the sheet-feeding tray 69 by a sheet-feeding roller 71 disposed under the front wall 69a. At the rear portion of the sheet-feeding tray 69, there is disposed a dashboard 72. The dashboard 72 is rotatably supported on a shaft 74 attached to a base plate 73 and is located crossing over the back wall 69b and above a stack of sheets placed in the sheet-feeding tray 69. A gear 75 is fixedly attached to the dashboard 72 and engages with a gear 77 which is rotatably supported on a shaft 76 attached to the base plate 73. One end of an arm 78 which is fixedly fixed to the gear 77 is attached to the shaft 76 and the other end of the arm 78 is attached to springs 79, 80. The spring 79 is a taut spring which serves to rotate the arm 78 clockwise. The other end of spring 80 is connected with a solenoid 81. When the solenoid 81 is in operation, the arm 78 and the dashboard 72 are located in the respective positions shown by solid lines.

A hole 82 is formed in the bottom plate 69c in a position under the dashboard 72. Through the hole 82, it is detected that no sheet S is left under the dashboard 72 and accordingly in the sheet-feeding tray 69.

In the case where sheets have to be fed again in accordance with a signal from the light receiving element 84 and that from a preset counter, the solenoid 81 is deenergized so that the arm 78 is rotated clockwise by the tension of the spring 79. Accordingly, the dashboard 72 is rotated counterclockwise by the gears 75, 77 until it is stopped by a stopper 62. Thus, the dashboard 72 is stopped in a position indicated by long and two short dash lines. At this moment, the sheets S which have been placed on the dashboard are completely placed in the sheet-feeding tray 69. When the sheets have been placed in the sheet-feeding tray 69, the solenoid 81 is energized again, whereby the dashboard 72 is rotated to the position indicated by solid lines.

Figure 7:
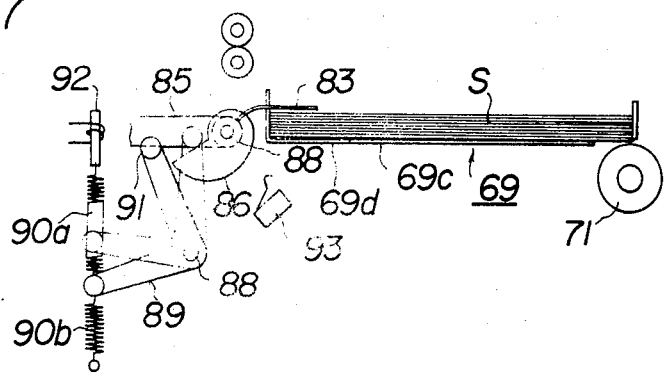
FIG. 7 is a schematic sectional side elevation of another sheet-feeding tray according to the present invention.
Figure 8:
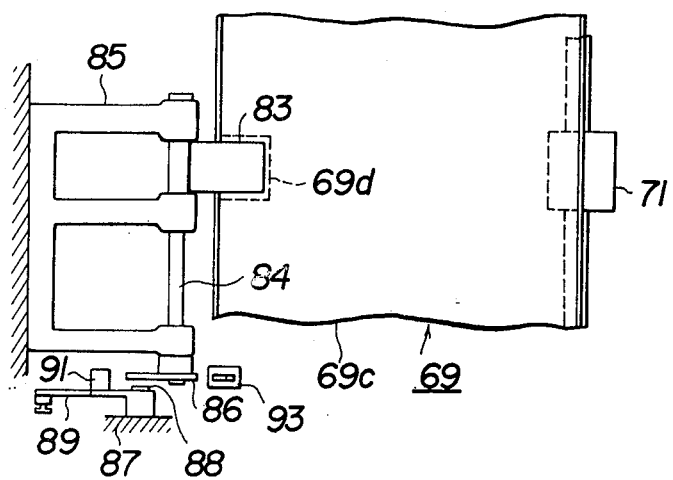
FIG. 8 is a schematic partial plan view of the sheet-feeding tray of FIG. 7.

FIGS. 7 and 8 show another sheet-feeding apparatus according to the present invention. Members or elements identical in function with those of the sheet-feeding apparatus of FIGS. 5 and 6 are given the same reference numerals as in FIGS. 5 and 6 and detailed explanation of those members or element is not repeated below.

Referring to FIGS. 7 and 8, one end of a dashboard 83 is fixed to a shaft 84. The shaft 84 is rotatably supported on a supporting member 85. A cam plate 86 is fixed to one end of the shaft 84. One end of a crank lever 89, which is supported rotatably on a shaft 88, fixed to the base plate 87 is connected with springs 90a, 90b, and a pin 91 is attached to the other end of the crank lever 89 and is designed so as to engage with the cam plate 86.

When a solenoid 92 attached to one end of the spring 90a is deenergized, the crank lever 89 is located in a position indicated by solid lines by the action of the spring 90b and the pin 91 is not engaged with the cam plate 86. Therefore, the dashboard 83 is placed under its own gravity on a stack of sheets S in the sheet-feeding apparatus 69. As sheets S are individually drawn out by the sheet-feeding roller 71, the dashboard 83 descends under its own gravity. When all the sheets S have been completely fed from the sheet-feeding apparatus 69, the dashboard 83 passes through a notch 69d formed in the bottom plate 69c under the dashboard 83 and pushes a microswitch 93 located in the path of the dashboard 83.

Using sheets which have been placed on the dashboard 83 are then placed in the sheet-feeding tray 69 for the next sheet-feeding. In the case where a further sheet-feeding has to be done in accordance with a signal from the microswitch 93 and signals from a preset counter and the like, the solenoid 92 is energized so that the crank lever 89 is rotated clockwise by the spring 90a. Thus, the pin 91 is engaged with the cam plate 86 and the dashboard 83 is likewise rotated clockwise so as to lie under its own gravity on the sheets S in the sheet-feeding tray 69.

Figure 9:
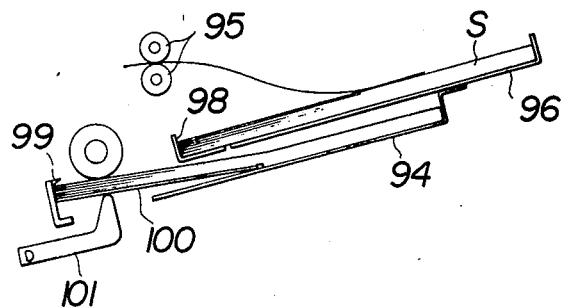
FIG. 9 is a schematic sectional side elevation of a further sheet-feeding tray according to the present invention.
Figure 10:
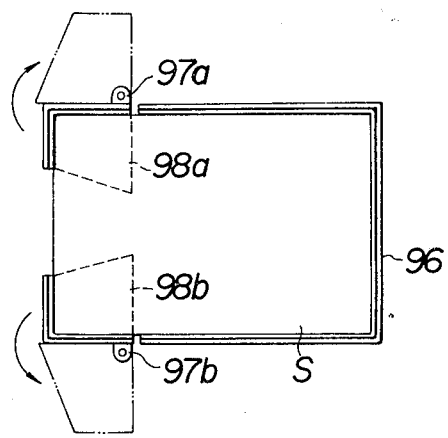
FIG. 10 is a schematic plan view of the sheet-feeding tray of FIG. 9.

FIGS. 9 and 10 shows a further sheet-feeding tray according to the present invention, wherein a sheet-receiving tray for holding temporarily used sheets is disposed above a sheet-feeding tray or a sheet-feeding cassette. In the figures, above a sheet-feeding tray 94, there is disposed a sheet-receiving tray 96 which temporarily receives thereon exposed sheet originals or transfer sheets, having had images on one side thereof, fed from sheet discharge rollers 95. At the lower portion of the sheet-receiving tray 96, there are disposed movable receiving plates 98a, 98b which are rotatable about shafts 97a 97b, respectively.

When the movable receiving plates 98a, 98b are rotated in the direction of the respective arrows as shown in FIG. 10, sheets S which have been stacked on the movable receiving plates 98a, 98b are fed into the sheet-feeding tray 94 under the gravity of the sheets S or by an appropriate transfer means and the leading edges of the sheets S are engaged with the corner separators 99.

At this moment, since a lever 101 which lifts a bottom plate 100 is retracted downwards, the sheets S can be placed in the sheet-feeding tray 94 without any difficulty. Furthermore, as the movable receiving plates 98a, 98b are retracted to opposite sides symmetrically, the sheets S can be fed into the sheet-feeding tray 94 without disturbing the stacking condition of the sheets S.

Furthermore, the respective dashboards 53, 63 of FIGS. 3 and 4 can be designed so as to retract from the respective sheet original feeding cassettes 42 and 55 parallel to the moving direction of the sheets instead of the moving modes of the dashboards of FIGS. 5 through 8.

Figure 11:
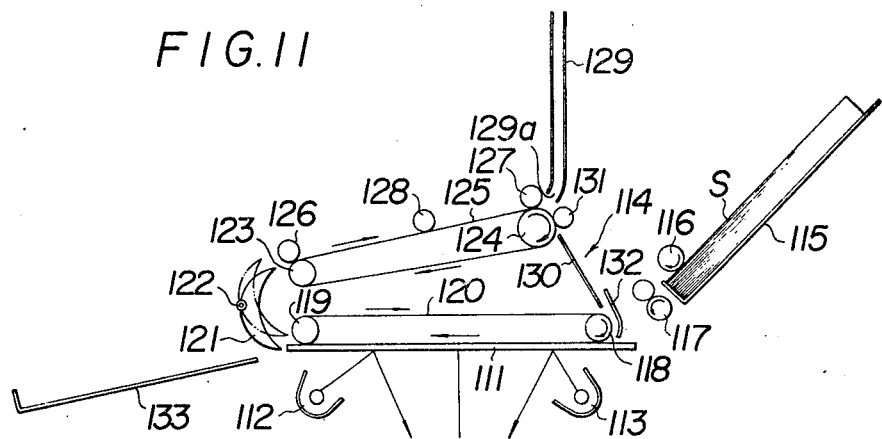
FIG. 11 is a schematic sectional side elevation of and a further embodiment of auto document feeder according to the present invention.

FIG. 11 is a schematic sectional side elevation of a further embodiment of auto document feeder according to the present invention. In the figure, reference numeral 111 represents a document platen or contact glass made of a transparent glass. At the lower opposite sides of the document platen 111, there are disposed light sources 112, 113. Reference numeral 114 collectively identifies the auto document feeder according to the present invention. The auto document feeder 14 is mounted on the document platen 111 and includes a sheet original feeding cassette 115 which is disposed on one side of the document platen 111. Namely, in the figure, the sheet original feeding cassette 115 is disposed slantingly or inclined on the right side of the document platen 111. The sheet original feeding cassette 115 is designed so as to be capable of holding a stack of sheet originals thereon and capable of discharging the sheet originals individually from the lower portion thereof. Near the lower portion of the sheet original feeding cassette 115, there is arranged a sheet-feeding roller means 116 capable of discharging top sheet originals one by one from the stack of sheet originals in the sheet original feeding apparatus. The sheet-feeding roller means 116 is also designed so as to feed the sheet originals individually between a pair of sheet transfer rollers 117. The sheet transfer rollers 117 are arranged so as to feed the sheet originals individually onto the upper surface of the document platen 111. On the document platen 111, there is also arranged a first endless belt 120 trained around rollers 118, 119 disposed on opposite sides of the document platen 111. The lower run of the first endless belt 120 substantially slides on the upper surface of the document platen 111, whereby each sheet original transported to the right side of the document platen 111 by the rollers 117 is further transported to a predetermined position on the document platen 111 and is brought into close contact with the document platen 111. Namely, the first endless belt 120 serves as a pressure belt.

On the other side of the document platen 111, namely, on the leftmost side of the document platen 111 in the figure, a movable guide plate 121 having a substantially semicircular guide surface is rotatably supported on a shaft 122. Rollers 123, 124 are arranged near the upper end portion of the movable guide plate 121 and near a position above the right end of the document platen 111, respectively. The rollers 123, 124 are connected by a second endless belt 125 trained thereround. The rollers 123, 124 are cooperable with guide rollers 126, 127, respectively, each of which is rotatably in contact with the second endless belt 125. Furthermore, a guide roller 128 is arranged between the rollers 123, 124 so as to be in contact with the upper surface of the second endless belt 125.

Near the roller 124, there is located sheet original reversing and accommodating means 129 which substantially stands erect or slantingly. The sheet original reversing and accommodating means 129 is designed so as to be capable of accommodating a single sheet and the lower end portion thereof opens in the direction between the belt 125 and the guide roller 127 so that the opening of the sheet original reversing and accommodating means 129 constitutes an opening 129a to take in a sheet original discharged from between the belt 125 and the guide roller 127.

On the left side of the roller 124 is also arranged a guide roller 131 which is in contact with the second endless belt 125 and serves to discharge a sheet original, which has been drawn into the sheet original reversing and accommodating means 129, onto a guide plate 130 from the lower end portion of the means 129.

The guide plate 130 is slantingly disposed between the roller 124 and the roller 118. The sheet original which is descendingly guided in the direction of the document platen 111 by the guide plate 130 is guided by a guide element 132 to the nip formed by both a portion of the endless belt 120 right under the roller 118 and the upper surface of the document platen 111.

In the case of this embodiment, on the left side of the document platen 111, there is disposed a sheet original output tray 133 which is designed so as to receive the originals selectively thereon from the document platen 111, by operation of the movable guide plate 121.

A procedure of making duplex copies from duplex originals by use of the above-mentioned auto document feeder will now be described. First a plurality of duplex originals to be copied are stacked in the sheet original feeding apparatus 115 in order of pages, for example, with its first page up. When the stacking of such sheet originals has been finished, the duplex copying machine is started by turning on a starting switch thereof (not shown).

In accordance with a signal commanding the start of the copying machine, the sheet-feeding roller 116 begins to be rotated so that the top sheet original having images on both sides is fed from the stack of sheet originals to the right end of the document platen 111 by the rollers 117. At this moment, the first endless belt 120 is rotated clockwise between the rollers 118, 119. Thus, the sheet original fed up to the right end of the document platen 111 is transported to the left, sliding on the document platen 111, by the first endless belt 120. When the sheet original has been transported to a predetermined position on the document platen 111, the rotation of the first endless belt 120 is stopped and at the same time, the sheet original is stopped at a position for proper exposure. When a sheet original is set at a predetermined position as in the above-mentioned manner, the light sources 112, 113 are energized so that the under surface, namely the second page of the sheet original, is exposed. Upon completion of exposure of the second page, clockwise rotation of the endless belt 120 is resumed, whereby the sheet original is again caused to slide on the document platen 111 to the left in FIG. 11.

Then the leading edge of the sheet original is guided by the semicircular surface of the movable guide plate 121 to the nip formed by the guide roller 126 and a portion of the second endless belt 125 right on the roller 123. Thus, the sheet original is placed on the second endless belt 125 and directed to the right in FIG. 11, and is then guided into the nip formed by the belt 125 at the roller 124 and the guide roller 127. The sheet original discharged from the nip to the right in the figure is guided into the sheet original reversing and accommodating means 129 through the opening 129a thereof due to the rigid-elastic property of the sheet original, where it stands substantially upright and, when the rear end of the sheet original has passed through the above-mentioned nip, the sheet original is moved downwards under its own gravity. Accordingly, the rear end of the sheet original is caught between the belt 125 and the guide roller 131, whereby the sheet original is caused to descend along the guide plate 130 with its rear end becoming the leading end this time.

Figure 12:
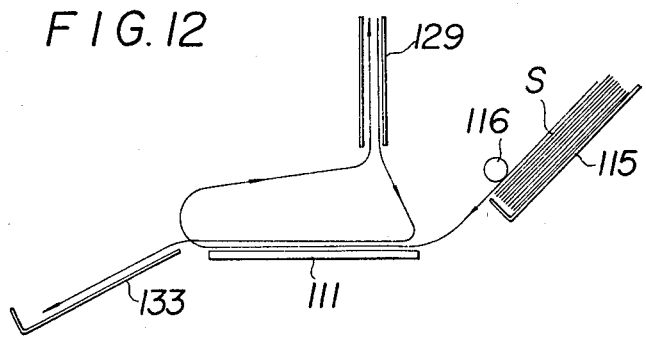
FIG. 12 illustrates a sheet-feeding path of the auto document feeder of FIG. 11.

Thus, the sheet original is again transported to the right end of the document platen 111 and is then carried up to the exposure position of the document platen 111 by the first endless belt 120. Since the sheet original has been reversed or inverted by this time by the sheet original reversing and accommodating means 129, its first page faces down. Accordingly the first page is exposed this time. When exposure of the first page has been finished, the sheet original is again transported to the left side of the document platen 111 by the first endless belt 120. At this moment, since the movable guide plate 121 has been rotated counterclockwise about the shaft 122 to a position indicated by a long and two short dash lines, the sheet original transported from the left side of the document platen 111 is discharged to the sheet original output tray 133 disposed on the left side of the document platen 111, without being transported in the direction of the second endless belt 125. Thus, exposure for duplex copying of a duplex sheet original is completed. The sheet-feeding path in this embodiment is schematically illustrated in FIG. 12. By repeating the same procedure as mentioned above, duplex copying of duplex sheet originals stacked in the sheet original feeding cassette 115 can be performed individually.

While specific embodiments of the invention have been shown and described in detail to illustrate the application of the principles of the invention, it will be understood that the invention may be embodied otherwise without departing from such principles.

What is claimed is:

1. An auto document feeder, for use with a duplex copying machine having an exposure station and adapted to be mounted on the exposure station, said auto document feeder comprising: sheet feeding means operable to hold therein a plurality of sheet originals to be copied and to feed the sheet originals therefrom individually in predetermined sequence and orientation to said exposure station, said sheet feeding means comprising a primary original-receiving table and a secondary original-receiving table, which are disposed on opposite sides of said exposure station, said sheet originals being initially stacked in said primary original receiving table for individual feeding thereof, by said sheet feeding means, to said exposure station for copying first sides thereof; platen belt means mounted on said exposure station and operable to transport a sheet original across said exposure station and to maintain each sheet original in close contact with said exposure station during exposure of the sheet original; sheet reversing means operable to receive sheet originals from said exposure station and to invert the received sheet originals, said sheet reversing means delivering each of said originals, after inversion thereof, to said secondary original-receiving table for individual delivery therefrom to said exposure station for copying of the opposite side thereof; and sheet transport means operable to transport sheet originals individually from said sheet reversing means to said sheet feeding means.

2. An auto document feeder, for use with a duplex copying machine and having an exposure station and adapted to be mounted on the exposure station, said auto document feeder comprising: sheet feeding means comprising a primary original-receiving table and a secondary original-receiving table disposed on opposite sides of said exposure station, and respective sheet feeding devices each associated with a respective one of said original-receiving tables, each of said original-receiving tables being operable to hold therein a plurality of sheet originals to be copied and to feed the sheet originals therefrom individually to said exposure station, said original-receiving table holding said sheet originals in predetermined sequence and orientation; platen belt means mounted on said exposure station and operable to transport a sheet original across said exposure station and to maintain each sheet original in close contact with said exposure station during exposure of the sheet original; sheet reversing means comprising a primary sheet reversing and inverting apparatus associated with said secondary original-receiving table and a secondary sheet reversing and inverting apparatus associated with said primary original-receiving table, said primary sheet reversing apparatus feeding inverted sheet originals to said secondary original-receiving table and said secondary sheet reversing apparatus feeding inverted sheet originals to said primary original-receiving table; and sheet transport means operable to transport sheet originals individually from said sheet reversing means to said sheet feeding means.

3. An auto document feeder, for use with a duplex copying machine having an exposure station and adapted to be mounted on the exposure station, said auto document feeder comprising: sheet feeding means comprising an original table located at one side of said exposure station and operable to hold therein a plurality of sheet originals to be copied and to feed the sheet originals therefrom individually in predetermined sequence and orientation to said exposure station; platen belt means mounted on said exposure station and operable to transport a sheet original across said exposure station and to maintain each sheet original in close contact with said exposure station during exposure of the sheet original, said platen belt means being reversible to effect copying of one side of each sheet original during a forward movement of said platen belt means and a copying of the other side of the sheet original during a backward movement of said platen belt means; sheet reversing means operable to receive sheet originals from said exposure station and to invert the received sheet originals, said sheet reversing means comprising a primary sheet reversing apparatus and a secondary sheet reversing apparatus, said primary sheet reversing apparatus feeding sheet originals to said original table and said secondary sheet reversing apparatus feeding sheet originals to said exposure station of copying said other sides of said sheet originals; and sheet transport means operable to transport said sheet originals individually from said sheet reversing means to said sheet feeding means.

4. An auto document feeder, as claimed in claim 3, wherein said sheet reversing means is oriented at an angle to to the horizontal and the vertical.

5. An auto document feeder, as claimed in claim 3, wherein said sheet feed means includes a dashboard positionable in said original table to separate sheet originals remaining in said original table from sheet originals returning from said exposure station.

6. An auto document feeder, as claimed in claim 5, wherein said dashboard has a first position separating sheet originals remaining in said original table from sheet originals returning from said exposure station, and a second position in which it is retracted so that sheet originals returning from said exposure station can fall into said original table.

7. An auto document feeder, as claimed in claim 1, wherein said sheet feed means includes a dashboard positionable in at least one of said original-receiving tables to separate sheet originals remaining in said one of said original-receiving tables from sheet originals returning from said exposure station.

8. An auto document feeder, as claimed in claim 7, wherein said dashboard has a first position-separating sheet originals remaining in at least one of said original-receiving tables from sheet originals returning from said exposure station, and a second position in which it is retracted so that sheet originals returning from said exposure station can fall into said at least one of said original-receiving tables.

9. An auto document feeder, as claimed in claim 2, wherein said sheet feed means includes a dashboard positionable in at least one of said original-receiving tables to separate sheet originals remaining in said one of said original-receiving tables from sheet originals returning from said exposure station.

10. An auto document feeder, as claimed in claim 9, wherein said dashboard has a first position-separating sheet originals remaining in at least one of said original-receiving tables from sheet originals returning from said exposure station, and a second position in which it is retracted so that sheet originals returning from said exposure station can fall into said at least one of said original-receiving tables.

11. An auto document feeder, as claimed in claim 1, wherein said sheet reversing means is oriented at an angle to the horizontal and the vertical.

12. An auto document feeder, as claimed in claim 2, wherein said sheet reversing means is oriented at an angle to the horizontal and the vertical.

* * * * *